United States Patent [19]

Matheson

[11] Patent Number: 4,570,930

[45] Date of Patent: Feb. 18, 1986

[54] SYSTEM, METHOD, AND STATION INTERFACE ARRANGEMENT FOR PLAYING VIDEO GAME OVER TELEPHONE LINES

[75] Inventor: Thomas G. Matheson, Madison, N.J.

[73] Assignee: AT&T Bell Laboratories, Murray Hill, N.J.

[21] Appl. No.: 538,342

[22] Filed: Oct. 3, 1983

[51] Int. Cl.[4] ............................................. A63F 9/22
[52] U.S. Cl. .......................... 273/1 E; 273/DIG. 28
[58] Field of Search ............ 273/85 G, DIG. 28, 1 E; 375/8, 108, 110–114; 371/33, 34, 67–70

[56] References Cited

U.S. PATENT DOCUMENTS 3,910,322 10/1975 Hardesty, Jr. et al. ............... 371/34
4,063,220 12/1977 Metcalfe et al. ................. 340/825.5
4,126,851 11/1978 Okor ................................. 273/85 G

OTHER PUBLICATIONS

*BYTE Publications, Inc.*, Dec. 1981, "Commbat: A Tele-Game for Two", by George Stewart, pp. 100–104.
*New Electronics*, Dec. 9, 1980, vol. 13, No. 24, "Telesoftware—The Computer in your TV Set", by John Hedger, pp. 50–58.
*BYTE Publications, Inc.*, Sep. 1981, "The Xerox Alto Computer", Thomas A. Wadlow, pp. 58–68.

*Primary Examiner*—Richard C. Pinkham
*Assistant Examiner*—Vincent A. Mosconi
*Attorney, Agent, or Firm*—Jack S. Cubert

[57] ABSTRACT

A system, method and station interface arrangement which permits video games to be played over a telephone network is disclosed. Communications delay between the games can be mitigated by transmitting local player position data to a remote game, the position data being detected at a local game during a current "generation" but the position data not being used by the local and remote games until the next generation and the transmission occurring during the time interval in which the current generation is being run at the local game. The position data can be encoded so that errors, e.g. transmission errors, may be detected. Detected errors may be corrected by retransmitting the priorly transmitted local position data. In addition, the games may be synchronized or resynchronized by transmitting a frame count along with the position data. The frame count may identify by order of succession the respective local and remote position data so that the games obtain and remain synchronized.

20 Claims, 5 Drawing Figures

FIG. 3
DETAILED PROCESSOR FLOW CHART

SYSTEM, METHOD, AND STATION INTERFACE ARRANGEMENT FOR PLAYING VIDEO GAME OVER TELEPHONE LINES

TECHNICAL FIELD

This invention relates to electronic television games and, more particularly, to a system, method and station interface arrangement for playing action video games over standard telephone lines.

BACKGROUND OF THE INVENTION

In recent years there has been a significant increase in the popularity and the use of electronic video games. Typically video games are displayed and played on the screen of a conventional television receiver. The variety and the complexity of electronic video games have increased by the use of a digital microprocessor in a game player console. In one form, these games include the microprocessor packaged with a preprogrammed read only memory (ROM) and player actuated spot position control potentiometers, which permit the spot position of a character, the characters being representative of game players, to move around on the television screen. Each preprogrammed memory contains a set of program instructions for a particular video game. By replacing one preprogrammed memory with another preprogrammed memory, a completely new game may be played.

The interconnection of two or more video games may then become desirable. One such arrangement is hinted at in the publication by T. A. Waldow, "The Xerox Alto Computer," *Byte Magazine* (September 1981), pp. 58–68. To interconnect the games the Wadlow arrangement uses a Carrier Sense Multiple Access System with Collision Detection (CSMA/CD) such as disclosed in U.S. Pat. No. 4,063,220, issued Dec. 13, 1977. On the one hand, a CSMA/CD System communicates packets of information and operates at bit rates in the order of 3 megabits per second. On the other hand, a standard telephone line operates at bit rates in the order of 300 bits per second. This raises a dilemma. How can high speed video games be competitively played between users who are interconnected over low speed standard telephone lines?"

Unfortunately, the communications between video games connected over telephone lines can be constrained in any of several ways. For example, each movement of a player actuated spot position control potentiometer, which may be embodied in the form of a joystick or a keyboard, typically provides in parallel a few bits of position data. The position data can be "squeezed" through a console port and converted, if need be, to a serial form for transmission between the games. Since the telephone line which is here assumed to be the data transmission link, is low speed, the absolute amount of information that can be exchanged between real time action games is limited. Otherwise, a significant delay in communications between games would likely occur.

Another constraint is found in synchronizing geographically separated games. In order for both video games to stay synchronized, one should communicate to the other what the one is actually doing. However, as priorly mentioned, (a) the telephone line is a low speed serial transmission link and (b) a limited amount of data is exchanged. The problem then is to determine an arrangement for exchanging a relatively small amount of data so that the games are likely to be, and to remain, synchronized.

Still another constraint can be found in detecting and correcting transmission errors. Noise across the telephone line can ordinarily impede the data communication link. Since burst errors are possible, an appropriate arrangement is also desired to detect and correct transmission errors.

SUMMARY OF THE INVENTION

These and other problems are mitigated in accordance with the principles of my invention by a system, method and station interface arrangement which permits video games to be played over telephone network line. Communications delay can be mitigated by transmitting local player position data to a remote game, the position data being detected at a local game during a current generation but the position data not being used by the local and remote games until the next generation and the transmission occurring during the time interval in which the current generation is being run at the local game. The position data can be encoded so that errors, e.g. transmission errors, may be detected. Detected errors may be corrected by retransmitting the priorly transmitted local position data. In addition, the games may be synchronized or resynchronized by transmitting a frame count along with the position data. The frame count may identify by order of succession the respective local and remote position data so that the games obtain and remain synchronized.

BRIEF DESCRIPTION OF THE DRAWING

The various features of the present invention will be readily understood from the following detailed description when taken in conjunction with the drawings in which.

DETAILED DESCRIPTION

Figure 1:
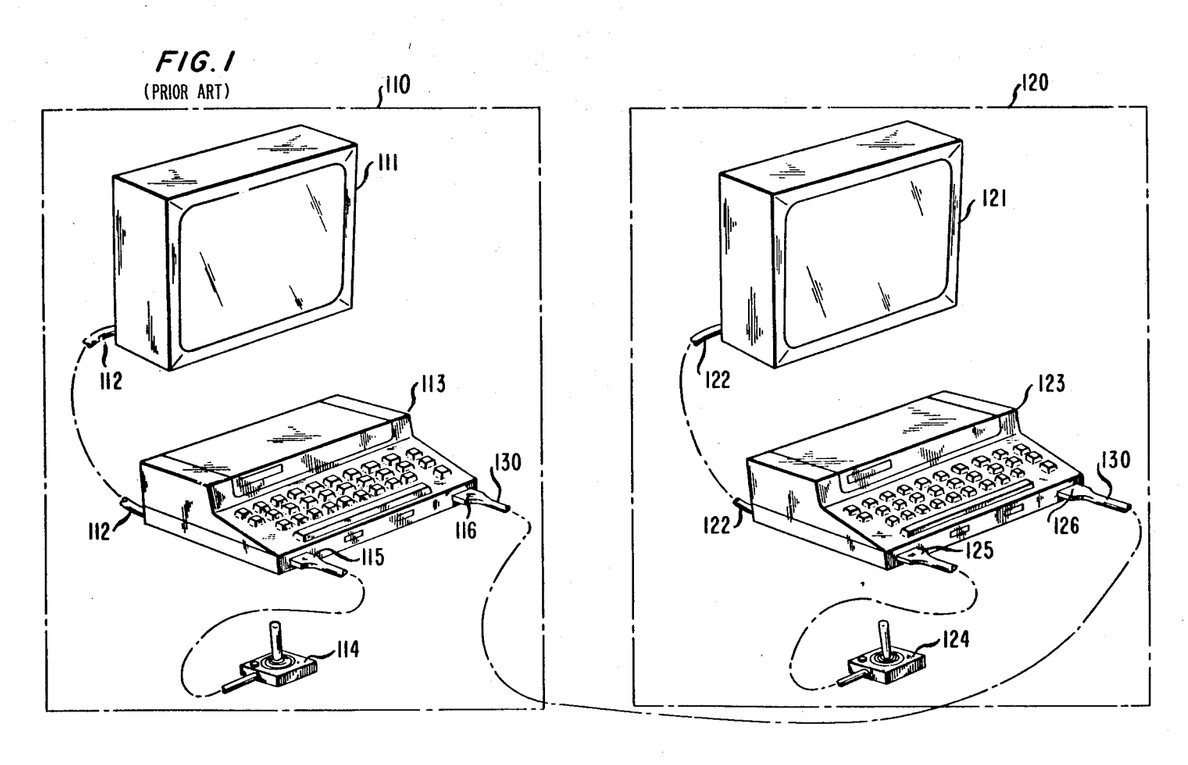
FIG. 1 illustrates a prior art arrangement for playing video games.

Referring to FIG. 1, two standard personal computer systems 110 and 120 are interconnected by cable 130. Each system 110 (or 120) includes a video display terminal 111 (or 121) connected to a player game console 113 (or 123) by a cable 112 (or 122), a joystick 114 (or 124) connected to the player game console 113 (or 123), and one or more input/output ports such as 115 (or 125) and 116 (or 126) on game console 113 (or 123). Game console 113 (or 123) may also include a typewriter-like keyboard, a memory, and a computer microprocessor. Software for a video game may reside in the console's memory and run on the microprocessor. To ports 115 (or 125) and 116 (or 126), a device such as a joystick 114 (or 124) or, alternatively, for example, a graphic mouse (not shown), may be connected. By the use of cable 130, which embodies a transmission link, the systems are interconnected through I/O ports 116 and 126. FIG. 1 is an illustrative alternative to the CSMA/CD system described in the aforecited Wadlow publication.

The principles of my invention are directed toward an arrangement including the use of a standard telephone line in place of the high-speed interconnection cable 130 as the data transmission link between the games. The principles are also directed toward an arrangement which, at the same time, permits the timely exchange of information by the respective video games whereby the players can be interactively competitive. An an aside, while my illustrative description is as to two players, it should be clear that one of the players could be a preprogrammed computer system to, in effect, permit the competition to occur "between man and machine."

Figure 2:
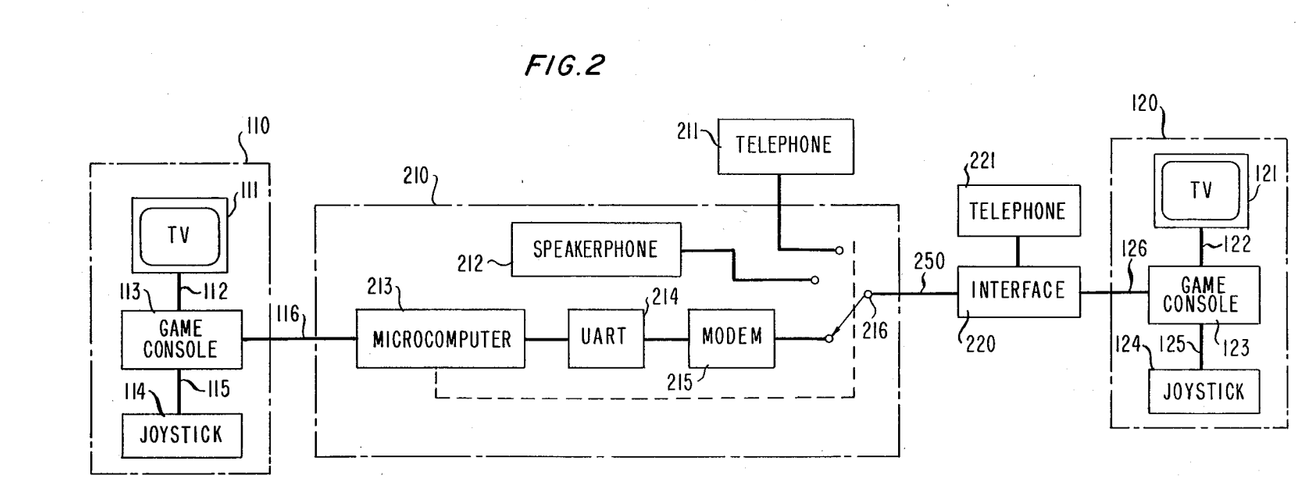
FIG. 2 amends the structure of FIG. 1 and shows an illustrative embodiment of the principles of my invention.

An illustrative embodiment of the principles of my invention is shown in FIG. 2. Personal computer systems 110 and 120 include much of the same structure as that described relative to FIG. 1. However, high speed interconnecting cable 130 is replaced by a combination of standard telephone line 250 interconnected through interface devices 210 and 220. Although not shown, telephone line 250 could include one or more telephone switching offices which are interconnected in any well known manner for completing telephone calls between calling and called parties. This replacement is advantageously employed in solving the aforementioned low speed interconnection problems.

Standard telephone 211 (or 221) may plug into a standard jack of interface 210 (or 220). Interfaces 210 and 220 are substantially similar. Therefore, in the following description of interface 210, it is understood that a similar description relates to interface 220. A user of telephone 211 may be connected to a user of telephone 221 through switch 216 when interconnected to standard telephone line 250. This connection may occur in much the same manner as for a typical telephone call. Once so connected, the telephone users agree as to what video game is to be played and insert the appropriate game software into the respective game consoles 113 and 123. Thus the same game may be run on each of computer systems 110 and 120. The computers become and remain synchronized by a process soon to be described, but which process includes exchanging some limited amount of data over telephone line 250. In one illustrative embodiment, local computer 110 may be interconnected through interface 210 including a combination of a microcomputer 213, UART 214, modem 215, and switch 216 thence over telephone line 250 to a similar interface 220 and finally to remote computer 120.

Microcomputer 213 is adapted as is hereinafter described to function as a controller of interface 210. It can be arranged to determine which device, e.g. telephone 211, modem 215, or speakerphone 212, is to be connected through switch 216 to telephone line 250. It can also be arranged to allow the telephone user (or game player) to (a) temporarily suspend play, (b) converse using telephone 211 or speakerphone 212, and (c) resume play exactly where the game was suspended. It can further be arranged as a controller to exchange position data, to synchronize the games and to detect and correct errors in the exchanged position data.

UART 214 may be any standard Universal Asynchronous Receiver/Transmitter (UART) for the parallel-to-serial and serial-to-parallel conversion of the exchanged information.

Modem 215 may be any standard modulator/demodulator, in the case of my illustrative embodiment, for communicating information over a standard telephone line at a bit rate of approximately 300 bits per second. It is to be understood, however, that other bit rates well-known in the art may be used.

Now and before more particularly describing some principles of my invention, it is appropriate for some lexicon to be reviewed as an aid to understanding the principles of my invention. In the video game art, the word "generation" has a connotation. For example, input position data to the video game software may be supplied from an I/O device such as the keyboard on game console 113 (or 123) or joystick 114 (or 124). The video game software running on the microprocessor included in game console 113 (or 123) processes the input position data. Responsive thereto, a different frame of information may or may not be displayed on the video screen 111. A "generation" then relates to supplying of position data, processing of the position data, and displaying a frame on the video screen. While the standard television set in the United States has a frame refresh rate of 60 frames per second, video games typically provide a new generation at a rate of 30 generations per second. Hence, it is commonplace for the game computer 110 (or 120) to process a new generation each approximately 33 milliseconds.

It is also appropriate to make some observations as an aid to understanding the principles of my invention.

Firstly, assume the player position data can be encoded in nine bit words. Since modem 215 operates at 300 bits per second, it takes about 30 milliseconds to transmit/receive a word between computer system 110 and computer system 120 over telephone line 250. In light of the transmission delay time, the respective game consoles 113 and 123 may sit idle until a position data word transmission is complete. As a result, each game console may spend about half its time waiting for player position information, thereby introducing a delay in the playing of the game.

Secondly, in FIG. 2, and as mentioned, computer systems 110 and 120 are assumed to be running the same game program. The course of the game is directed in response to position data provided by the player, who causes the position input to be provided through the use of, inter alia, the joystick 114 (or 124). This player position input would then be, and as will soon be described, exchanged between computer systems 110 and 120 by an arrangement which keeps both systems synchronized and at the same time utilizes the aforementioned transmission delay time to mitigate delay in the playing of the game. Synchronization is obtained and maintained when both computer system 110 and computer system 120 are in a not inconsistent logical state(s), for example, in a state such that the generation being run by system 110 is the same generation being run by system 120 and further such that, in the running of a generation, each system uses the identical player position input information.

Thirdly, assume that computer system 110 is transmitting data through interface 210 over telephone line 250 through interface 220 to computer system 120. For purposes of description and not by way of limitation, when computer system 110 is transmitting position data to computer system 120, computer system 110 is herein referred to as the local computer system while computer system 120 is referred to as the remote computer system, and vice-versa when system 120 is transmitting.

Fourthly, the position data that is being transmitted from the local computer system to the remote computer system is referred to as local position data. On the other hand, the position data that is received from the remote computer system is referred to as remote position data.

Fifthly, with respect to time, position data that is to be used in the present or current generation is considered to be in time interval "n". Position data that is to be used in the next or following generation is considered to be in time interval "n+1". Whichever time interval, it should be clear that each computer system would use both local position data and remote position data in providing a generation. Further, it should also be clear that, unless the local and remote position data which is being used in a generation, is identical at each computer system the systems will not be synchronized as to that generation and, hence, the games may tend to diverge.

According to a first aspect of the principles of my invention, a solution is provided to the problem relating to the delay time, i.e. to the time for the transmission of position data from the local system to the remote system.

Figure 3:
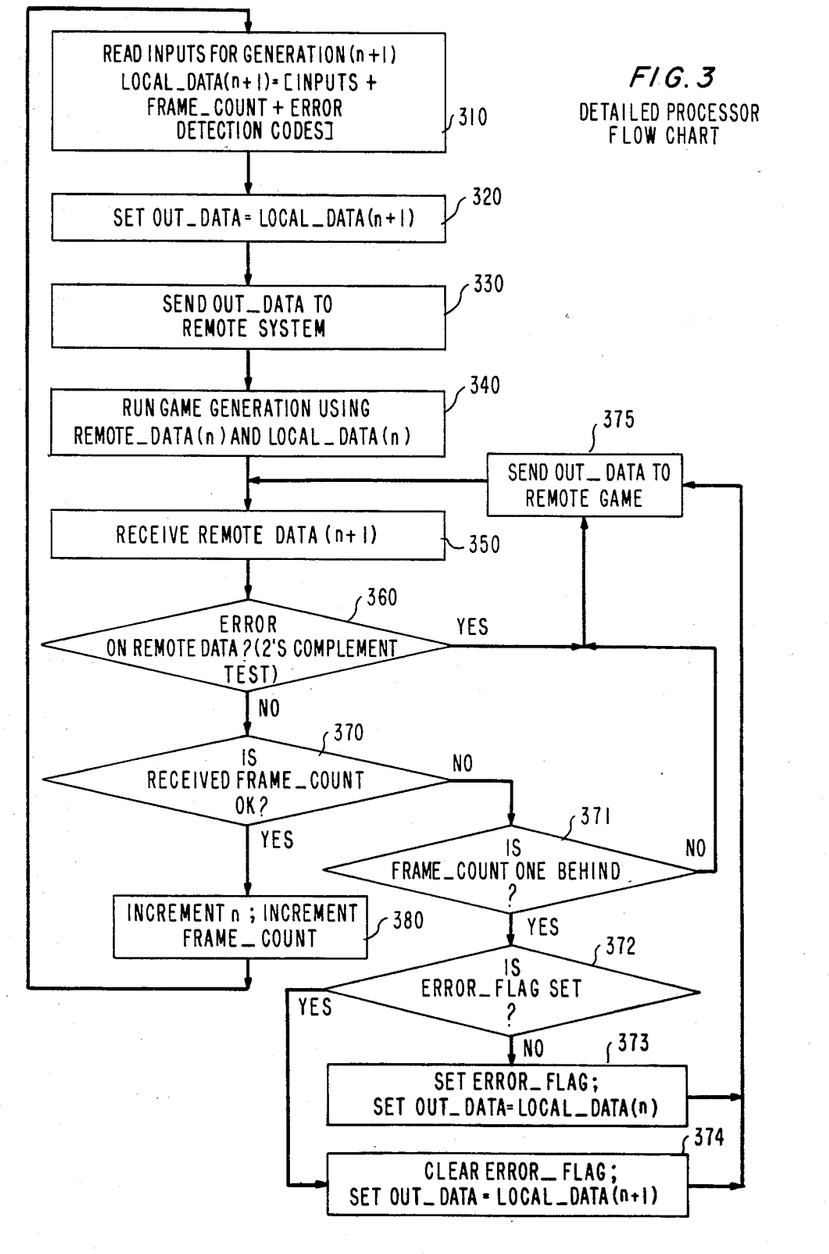
FIG. 3 illustrates in flow chart form a process in accordance with the principles of my invention, which process may be embodied in the structure illustrated in FIG. 2.

Broadly, while a (current) generation is being run during time interval "n" (recall a typical generation is processed each approximately 33 milliseconds), position data for use in the (next) generation to be run during time interval "n+1" may be transmitted from the local system to the remote system (recall it takes about 30 milliseconds to transmit a position word). A process including the above solution is shown in FIG. 3. Referring to the flowchart illustrated in FIG. 3, the process represented therein can itself be embodied in interface 210, for example, microcomputer 213 can be adapted to embody the process, while a parallel process can be embodied in interface 220.

More specifically, as to the process, at step 310, local position data for use in the generation to be run at the time interval "n+1" is read, or extended, during time interval "n" from, for example, joystick 114 (or 124) through port 115 (or 125) into game console 113 (or 123) and thence through port 116 (or 126) to interface unit 210 (or 220) and therein is stored in microcomputer 213 at step 320. The storage location is identified as "OUT DATA". The same local position data may also be stored in the memory of game console 113 (or 213). It may be noted that the local position data of one system (e.g., of the local system) is also transmitted (at step 330) to the other system (e.g. to the remote system), and with respect to its use at that other system, it is called the remote position data. The actual transmission at step 330 may occur while the game generation is being run at the next step 340.

At step 340, the remote position data detected during time interval "n−1" is read and provided from the interface unit to the game console for use in the generation being run at time interval "n". Also, as is clear from the foregoing, the local position data, which was priorly read from joystick 114 and stored in the memory of the game console in the time interval "n−1", is also read from the game console memory for use in the generation at time interval "n". Hence the game software has as inputs in time interval "n" both the local and the remote position data from the immediately prior time interval "n−1". Accordingly, the generation may be run (step 340).

Also while the game generation is being run at the above step 340, and as alluded to earlier, position data may be received (step 350) from the other (remote) system. The received position data is referred to as the remote position data. Thus during time interval "n", remote position data is being received for use in the (next) generation to be run during time interval "n+1".

As thus far described, the process shown in FIG. 3 relates to the communication of position data between interface 210 and interface 220. Local position data detected at time interval "n" is provided during time interval "n" to both the local system and the remote system for use in the next generation to be run at time interval "n+1" as, respectively, the local position data of the local system and as the remote position data of the remote system. Further, while the communication of position data between the two systems is occurring during time interval "n", both games may concurrently be running the current generation, which current generation uses the local and remote position data from time interval "n−1". Advantageously, this process avoids the games from being idle and avoids the waiting for position data from the respective remote system and hence mitigates the cited delay problem.

Figure 4:
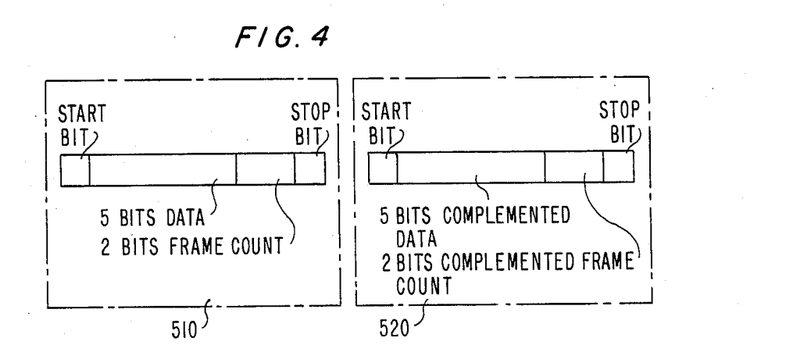
FIG. 4 illustrates 2-tuple position data words for use in the illustrative embodiment of FIG. 2.

According to a second aspect of the principles of my invention, an arrangement is included to detect errors. Referring also to FIG. 4, there is illustrated a nine-bit position data word which is of a format that can be used in my illustrative embodiment to detect errors. Assume a 2-tuple such as the two words, word 510 and word 520. Word 510 comprises a start bit, five bits of position data, two bits for a frame count, and a stop bit. (A use of the frame count will be made clear hereinafter.) Word 520 comprises a start bit, logically complemented five bits of position data, logically complemented two bits for a frame count, and a stop bit. As an aside, the logically complemented bits of the position data and the frame count form the one's complement representation of those bits. Continuing, in my illustrative embodiment, when position data is communicated between the two systems over the telephone line, it is now assumed that a 2-tuple including two serially communicated position words is communicated. As an aside, special error detection codes could be used in an alternative embodiment. However such codes may not offer significant advantage over the 100 percent redundancy obtained in the communication of two words. Continuing and as illustrated in word 510, five bits of position data are transmitted followed by a two bit frame count. Word 520, which is the complement of word 510, is transmitted directly after word 510. The receiving interface microcomputer, e.g. microcomputer 213 (or its counterpart in interface unit 220), may be adapted through step 360 to check for errors by incrementing the contents of one of the words and adding the result to the contents of the other word. As an aside, adding one to a one's complement representation forms the two's complement of the representation. Continuing, if the additive sum is zero, no error is assumed. (The two's complement of a number when added to the number should produce a zero sum.) If the additive sum is non-zero, an error is assumed. Thereby, an arrangement is included to detect errors.

According to a third aspect of the principles of my invention, an arrangement is included to correct errors. Here the aforementioned frame count comes into play. The two bit frame count in the position word can be used in the correction of detected errors. It is well known that two bits allows for counting up to four items. Thus assume a frame includes four items. Here, the two bit frame counter allows for counting four 2-tuples of position data, each 2-tuple being an item and including a position word and the complement of the position word. Accordingly the frame count in the first 2-tuple of a frame may be zero, the frame count in the second 2-tuple of the frame may be one, etc. The frame count repeats for each frame of position data.

Thus when a position word is transmitted from one interface, such as interface 210 (or 220), to the other interface, microcomputer 213 (or its counterpart in interface 220) in the transmitting interface may be adapted to insert such a sequential frame count in the respective position words. In parallel fashion, when a position word is received at the other interface, the microcomputer in the receiving interface may be adapted through step 370 to verify that a sequentially correct frame count is in each received (or remote) position word.

Now assume an error is detected at step 360 as aforedescribed. The following description relates to a process according to this third aspect for correcting the error.

Figure 5:
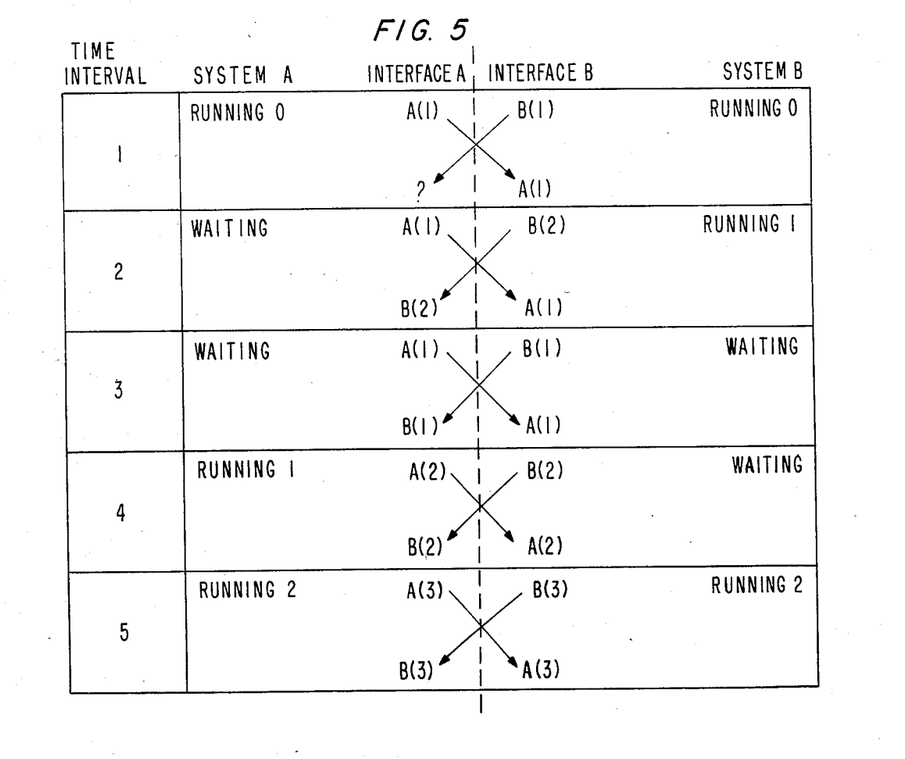
FIG. 5 is useful in describing, by way of example, some aspects of the principles of my invention.

Referring also to FIG. 5, there are shown five columns of information. The first (lefthand) column identifies the time interval being described. Next, rather than referring to systems 110 and 120 in this description, and in the interest of generality, one system is referred to as system A while the other system is referred to as system B. Thus the second and fifth columns labelled SYSTEM A and SYSTEM B, respectively, identify what is happening, for example, which generation is being run, at system A and system B, respectively. The third and fourth columns labeled INTERFACE A and INTERFACE B respectively, include two rows for each time interval in order to identify which 2-tuple is being transmitted from system A and from system B as well as which 2-tuple is being received at system A and system B, respectively.

Assume, as shown, in time interval one that system A and system B are running a generation using position data in frame zero, which is here labelled RUNNING 0. As priorly mentioned, while the generation at time interval "n" is being run, the systems are exchanging position data for the generation to be run at time interval "n+1". Thus interface A transmits, and interface B receives, a 2-tuple in frame one, here labelled A(1), while the frame zero generation is being run. In similar fashion, interface B transmits, while interface A is supposed to receive, a 2-tuple in frame one, here labelled B(1). However, assume that system A detects an error at step 360 in the received B(1) 2-tuple, hence the "?" in FIG. 5. During the next time interval, here during time interval two, the error correction process commences in response to the detected error. Firstly, since system B has correct position data from frame count one, i.e. A(1) and B(1), system B may run the generation for frame count one, which is labelled RUNNING 1 in the fifth column. Secondly, since system A has incorrect position data for frame count one, i.e. A(1) is correct but B(1) is not correct, system A requests a retransmission of the B(1) position word 2-tuple and enters a WAITING state. During the second time interval and while in the WAITING state, system A requests a retransmission by retransmitting its 2-tuple A(1) at step 375. The retransmitted 2-tuple has its usual (repeated) frame count, here frame count one. Thus by summary, during the next (second) time interval, system B (i) is running a generation for frame count one and (ii) is transmitting its 2-tuple for frame count two, i.e. B(2) and (iii) is receiving a retransmitted 2-tuple for frame count one, i.e. A(1). However, during the second time interval, System B is expecting a 2-tuple for frame count two, i.e. it is expecting A(2). Accordingly, at step 370 in response to detecting a retransmission of a 2-tuple with frame count one, i.e. A(1), system B is adapted through step 371 for a retransmission (or error correction) mode and hence enters a WAITING state during the next (or third) time interval. While in the WAITING state, interface B is adapted through step 372 to set an error flag and to retransmit the prior frame count 2-tuple, i.e. B(1), to interface A while interface A continues to retransmit the A(1) 2-tuple to interface B. Notice in FIG. 5 that the frame count of the 2-tuple being transmitted is now (in the third time interval) one for each system.

Assume that no error is detected in either the retransmitted A(1) or B(1) 2-tuples. Thusly in the next (or fourth) time interval since interface A has correct position data from frame count one, i.e., it has both A(1) and B(1), system A may run the generation for frame count one, which is labelled RUNNING 1. System B, on the other hand, remains in the WAITING state during the fourth time interval because system B has not yet received from system A the 2-tuple for frame count two, i.e. system B awaits A(2). While system A is running the generation for frame count one and while system B is in the WAITING state, the systems communicate the 2-tuples for frame count two at step 374. The generation for frame count two is run in the next (or fifth) time interval, which is labelled RUNNING 2. During that fifth time interval, position data are interchanged for frame count three. Thereby the detected error has been corrected and the games have been resynchronized.

A fourth aspect of the principles of my invention relates to the synchronization of the games.

Synchronization between the two systems is obtained and maintained through the use of the aforementioned frame count. Each interface may include a transmit and a receive frame counter. The sequential count of the frame counter corresponds to the consecutively provided frame count inserted in the position data. Thereby the order of succession of the transmitted and received position data is achieved. That is, the transmit frame counter is incremented and its contents inserted in the transmitted 2-tuple as priorly described. In similar fashion, a receive frame counter is incremented and its contents compared at step 370 with the frame count detected in a received 2-tuple. The frame count of the local position data and the frame count of the remote position data, when equal, means the games are synchronized. When the frame counts are not equal, the games are not synchronized. When the frame counts are the same, the frame count signal n is incremented in box 380 and the operations of box 310 are performed. Resynchronization is obtained as aforedescribed through, for example, steps 371, 372, 373, and 374.

Although the principles of my invention have been described and illustrated in detail, it is understood that the same is not by way of limitation but rather by way of illustration only. Modifications may be apparent to the skilled artworker. For example, the size of a frame and hence the number of bits in the frame counter may be other than as described, the order of information in a 2-tuple may be rearranged, an alternative to a 2-tuple may be used, one player could be a pre-programmed computer system to, in effect, permit the game to be played "between man and machine," etc. Hence the spirit and the scope of my invention is limited only by the terms of the appended claims.

What is claimed is:

1. A system for playing action video games over a telephone network, said video game system including at least a first computer system, said first computer system including an input device adapted to provide position data to said computer system; and an interface device adapted to permit said first computer system to be interconnected to one or more computer systems over a telephone network, and characterized in that said first computer system further comprises:

means responsive to said input device for exchanging position data between said first computer system and said telephone network during a predetermined game generation time interval to transmit position data from said first computer system to said telephone network and to receive position data from said telephone network, said exchanged position data for use in the next generation time interval in said first and said other computer systems, means for synchronizing said exchange of position data so that the position data exchanged in said generation time interval between said first computer system and said telephone network corresponds to the same game generation; and means responsive to the synchronized position data exchanged during the preceding game generation time interval for running a current generation on said first computer system during said current generation time interval wherein said synchronizing means comprises:

means for identifying the order of succession of the generations of transmitted and received position data; and means responsive to the identification of said transmitted position data and said received position data being the same for using said transmitted position data and said received position data in the next generation of said first computer system.

2. The video game system defined in claim 1 wherein:

said first computer system further comprises means coupled for detecting errors in the received position data; and means responsive to detected received position data error for retransmitting the last transmitted first computer system position data; and said synchronizing means comprises means responsive to said detected error for conditioning the first computer system to wait before running the current generation.

3. The video game system defined in claim 2 wherein said synchronizing means further comprises:

means responsive to receiving current generation error free position data while waiting for conditioning said first computer system to run the current generation.

4. The video game system defined in claim 1 wherein:

said generation identifying means comprises frame counting means;

said means responsive to the identification of said transmitted position data and said received data being the same for using said transmitted position data and said received position data in the next generation of said first computer system includes:

means for comparing the frame count of the received position data with the frame count of the transmitted position data, means responsive to the frame count of the received position data being equal to the frame count of the transmitted position data for incrementing said first computer system frame count; and means responsive to said incremented frame count for obtaining the current first computer system position data from said input device, transmitting said current first computer system position data as the next generation position data to said telephone network, receiving position data from said telephone network, and running the current generation on said first computer system.

5. The video game system defined in claim 1 wherein:

said generation identifying means comprises frame counting means;

and further comprises means responsive to the identification of said transmitted position data being different from said received data for using said transmitted position data and said received position data in the next generation of said first computer system including:

means for comparing the frame count of the received position data with the frame count of the transmitted position data;

means responsive to the frame count of the received position data being behind the frame count of the transmitted position data for setting an error flag signal; and means responsive to said set error flag signal for retransmitting the transmitted position data, receiving position data from said telephone network, and conditioning said first computer system to wait before running the current generation.

6. The video game system defined in claim 5 further comprising:

means responsive to the transmitted position data being the same as said received position data while said error flag signal is set for transmitting the current position data from said first computer system input device to said telephone network as the next generation position data and for conditioning said first computer system to run the current generation.

7. The video game system defined in claim 1 further comprising:

means for applying voice signals to and for receiving voice signals from said telephone network; and means for switching between said voice signal applying and receiving means and said position data exchanging and first computer enabling means to permit voice communication during the game.

8. Station apparatus for use in playing action video games, said station apparatus adapted to be coupled to a first computer system that includes an input device adapted to provide position data to said first computer system and an interface device adapted to permit said first computer system to be interconnected to one or more computer systems over a telephone network and characterized in that said station apparatus comprises:

means for exchanging position data between said first computer system and said telephone network during a predetermined game generation time interval to transmit position data from the first computer system to said telephone network and to receive position data from said telephone network, said exchanged position data for use in the next game generation time interval;

means for synchronizing said exchange of position data so that the position data exchanged in said generation time interval between said first computer system and said telephone network corresponds to the same game generation; and means responsive to the synchronized position data exchange during the preceding game generation time interval for running a current generation on said first computer system during said current generation time interval wherein said synchronizing means comprises:

means for identifying the order of succession of the generations of transmitted and received position data;

means responsive to the identification of said transmitted position data and said received data being the same for using said transmitted position data and said received position data in the next generation of said first computer system.

9. The station apparatus defined in claim 8 wherein:

said station apparatus further comprises means coupled to said first computer system for detecting errors in the received position data;

means responsive to detected received position data error for retransmitting the last transmitted first computer system position data; and said synchronizing means comprises means responsive to said detected error for conditioning the first computer system to wait before running the current generation.

10. The station apparatus defined in claim 9 wherein said synchronizing means further comprises:

means responsive to receiving current generation error free position data while waiting for conditioning said first computer system to run the current generation.

11. The station apparatus defined in claim 8 wherein:

said generation identifying means comprises frame counting means;

said means responsive to the identification of said transmitted position data and said received data being the same for using said transmitted position data and said received position data in the next generation of said first computer system includes:

means for comparing the frame count of the received position data with the frame count of the transmitted position data;

means responsive to the frame count of the received position data being equal to the frame count of the transmitted position data for incrementing said first computer system frame count; and means responsive to said incremented frame count for obtaining the current first computer system position data from said input device, transmitting said current first computer system position data as the next generation position data to said telephone network, receiving position data from said telephone network, and running the current generation on said first computer system.

12. The station apparatus defined in claim 8 wherein:

said generation identifying means comprises frame counting means;

and further comprises means responsive to the identification of said transmitted position data being different from said received data for using said transmitted position data and said received position data in the next generation of said first computer system including:

means for comparing the frame count of the received position data with the frame count of the transmitted position data;

means responsive to the frame count of the received position data being one behind the frame count of the transmitted position data for setting an error flag signal; and means responsive to said set error flag signal for retransmitting the transmitted position data, receiving position data from said telephone network, and conditioning said first computer system to wait before running the current generation.

13. The station apparatus defined in claim 12 further comprising:

means responsive to the transmitted position data being the same as said received position data while said error flag signal is set for transmitting the current position data from said first computer system input device to said telephone network as the next generation position data and conditioning said first computer system to run the current generation.

14. The station apparatus defined in claim 8 further comprising:

means for applying voice signals to and for receiving voice signals from said telephone network; and means for switching between said voice signal applying and receiving means and said position data exchanging and first computer enabling means to permit voice communication during the game.

15. A method for playing action video games over a telephone network in a video game system, said video game system including at least a first computer system comprising an input device adapted to provide position data to said first computer system, and an interface device adapted to permit said first computer system to be interconnected to one or more computer systems over a telephone network and characterized in that said method comprises the steps of:

exchanging position data between said first computer system and said telephone network during a predetermined game generation time interval responsive to said input device to transmit position data from said first computer system to said telephone network and to receive position data from said telephone network, said exchanged position data for use in the next generation time interval in said first and said other computer systems;

synchronizing said exchange of position data so that the position data exchanged in said generation time interval between said first computer system and said telephone network corresponds to the same game generation; and running a current generation on said first computer system during said current generation time interval responsive to said synchronized position data exchange during the preceding game generation time interval wherein said synchronizing step comprises:

identifying the order of succession of the generations of transmitted and received position data; and using said transmitted position data and said received position data in the next generation of said first computer system responsive to the identification of said transmitted position data and said received transmission data being the same.

16. The method for playing action video games over a telephone network in a video game system defined in claim 15 wherein:
   detecting errors in the received position data in said first computer system;
   retransmitting the last transmitted first computer system position data responsive to detected received position data error; and
   said synchronizing comprises conditioning the first computer system to wait before running the current generation responsive to said detected error.

17. The method for playing action video games over a telephone network in a video game system defined in claim 16 wherein:
   said synchronizing step further comprises conditioning said first computer system to run the current generation responsive to receiving current generation error free position data while waiting.

18. The method for playing action video games over a telephone network in a video game system defined in claim 15 wherein:
   said generation identifying step comprises frame counting; and
   the step of using said transmitted position data and said received position data in the next generation of said first computer system includes:
   comparing the frame count of the received position data with the frame count of the transmitted position data, incrementing said first computer system frame count responsive to the frame count of the received position data being equal to the frame count of the transmitted position data, and
   responsive to said incremented frame count, obtaining the current first computer system position data from said input device, transmitting said current first computer system position data as the next generation position data to said telephone network, receiving position data from said telephone network, and running the current generation on said first computer system.

19. The method for playing action video games over a telephone network in a video game system defined in claim 15 wherein:
   said generation identifying step comprises frame counting;
   and further comprises using the transmitted position data and said received position data in the next generation of said first computer system responsive to the identification of said transmitted position data being different from said received data including:
   comparing the frame count of the received position data with the frame count of the transmitted position data;
   setting an error flag signal responsive to the frame count of the received position data being one behind the frame count of the transmitted position data; and
   responsive to said set error flag signal for retransmitting the transmitted position data, receiving position data from said telephone network, and conditioning said first computer system to wait before running the current generation.

20. The method for playing action video games over a telephone network in a video game system defined in claim 19 further comprising:
   responsive to the transmitted position data being the same as said received position data while said error flag signal is set, transmitting the current position data from said first computer system input device to said telephone network as the next generation position data and for conditioning said first computer system to run the current generation.

* * * * *